United States Patent [19]
Nitz et al.

[11] Patent Number: 5,697,835
[45] Date of Patent: Dec. 16, 1997

[54] OSCILLATING CUTTING BLADES

[76] Inventors: Joseph W. Nitz, 1490 Sonoma Ave., Albany, Calif. 94706; Donald Bruce Gordon, 685 Santa Maria Rd., El Sobrante, Calif. 94803

[21] Appl. No.: 370,396

[22] Filed: Jan. 9, 1995

[51] Int. Cl.$^6$ .............................. B28D 1/04; B27B 33/02
[52] U.S. Cl. .............................. 451/548; 83/837; 83/848; 30/347; 30/353; 30/388; 125/15; 125/19
[58] Field of Search .............................. 451/548; 83/835, 83/837, 847, 848, 676; 30/166.3, 346, 347, 353, 355, 356, 357, 388; 125/15, 13.01, 19; D8/66

[56] References Cited

U.S. PATENT DOCUMENTS

| | | | |
|---|---|---|---|
| 1,139,817 | 5/1915 | Smith | 451/548 X |
| 3,831,484 | 8/1974 | Gibb | 83/847 |
| 3,869,795 | 3/1975 | Treace | 30/388 |
| 4,454,901 | 6/1984 | Thorsness | 83/854 X |
| 4,637,370 | 1/1987 | Ishizuka | 83/835 X |
| 4,962,748 | 10/1990 | Schweickhardt | 451/548 X |
| 5,265,340 | 11/1993 | Nitz et al. | 30/166.3 |

*Primary Examiner*—Rinaldi I. Rada
*Assistant Examiner*—Raymond D. Woods
*Attorney, Agent, or Firm*—Howard Cohen

[57] ABSTRACT

Multifunctional blade designs for rotational oscillating cutting include, in one aspect, different cutting teeth segments and cutting agent segments arranged along separate portions of a common cutting edge to carry out various cutting tasks. In another aspect, non-circular cutting blades have separate cutting edge segments, each segment having different cutting teeth or cutting agents. The blade edge may include one portion having grit bonded to the cutting edge to cut hard objects, and another portion having cutting teeth for cutting softer objects. Likewise, the blade edge may include two portions, each having cutting teeth of differing size and pitch to cut differing materials. Another embodiment comprises a triangular blade, the sides of the triangle provided with cutting grit bonded to the edges. Alternatively, at least one side of the triangle may include cutting teeth, so that each side of the triangle is adapted to cut different types of materials. A further embodiment comprises a teardrop shaped blade, defined by a pair of generally straight edges extending from a common vertex to opposed ends of an arcuate edge segment. The arcuate segment may be provided with cutting grit bonded thereto to cut hard materials, and the straight edges may be provided with cutting teeth to cut softer materials. Alternatively, one straight edge and a contiguous portion of the arcuate segment may be provided with cutting grit bonded thereto, and the other straight edge and contiguous portion of the arcuate segment may be provided with cutting teeth.

4 Claims, 4 Drawing Sheets

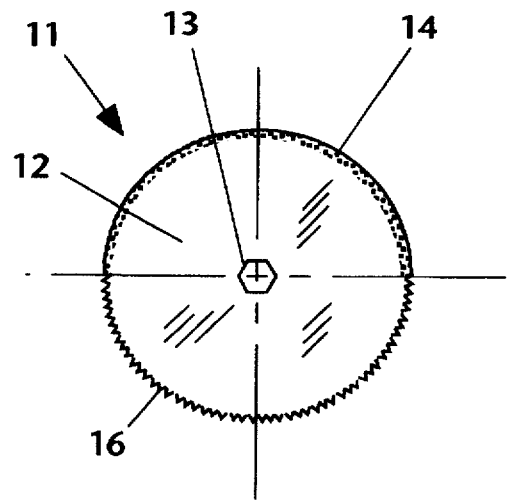
Figure_1
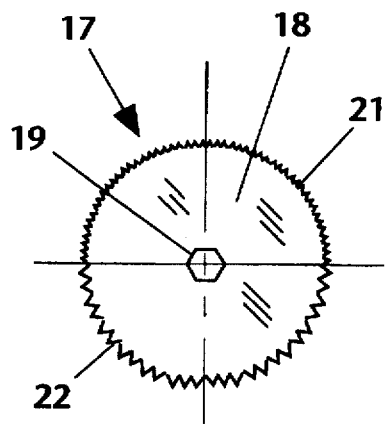
Figure_2
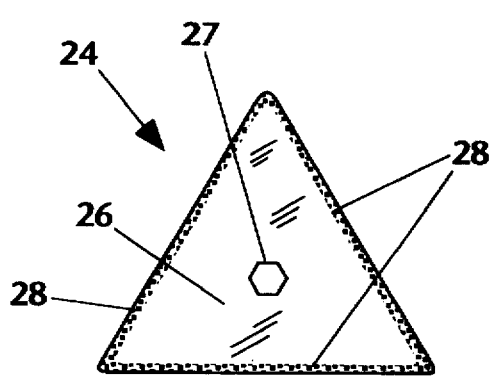
Figure_3
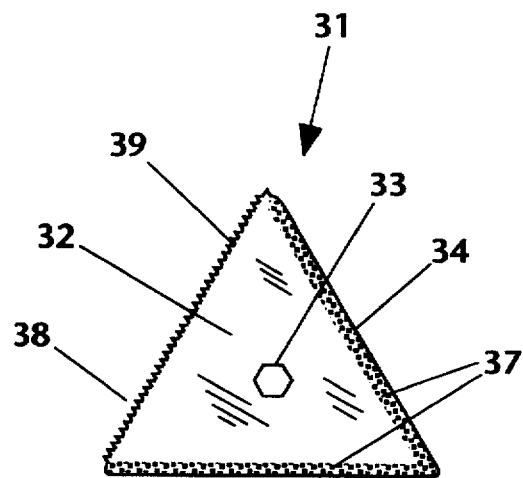
Figure_4

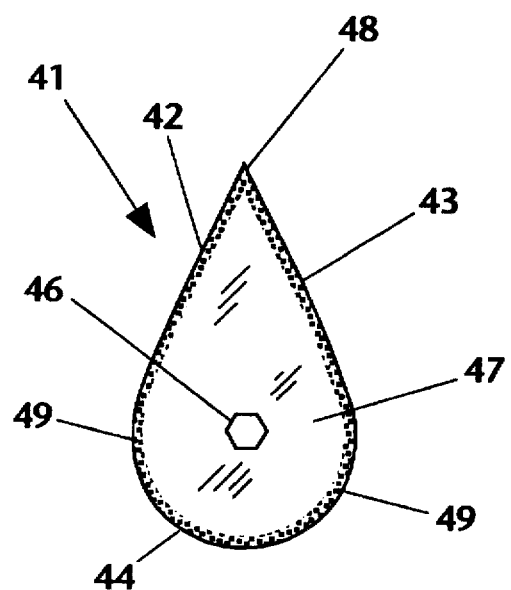
Figure_5
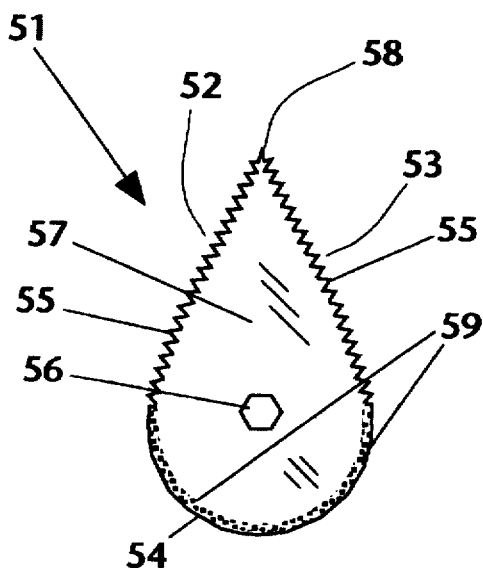
Figure_6
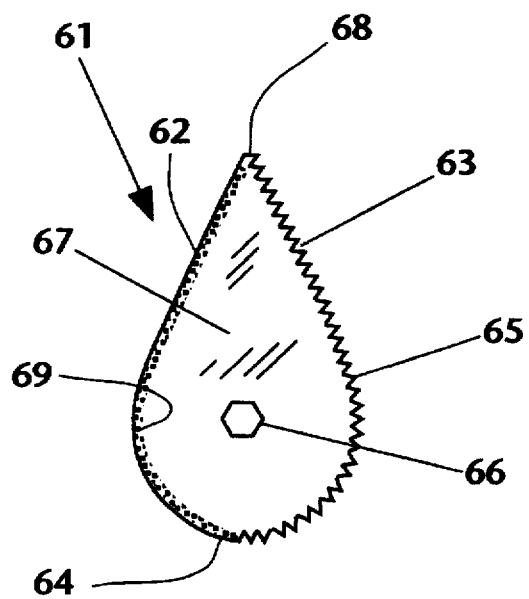
Figure_7

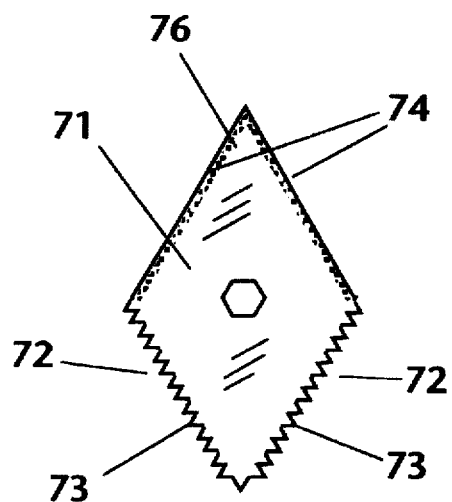
Figure_8
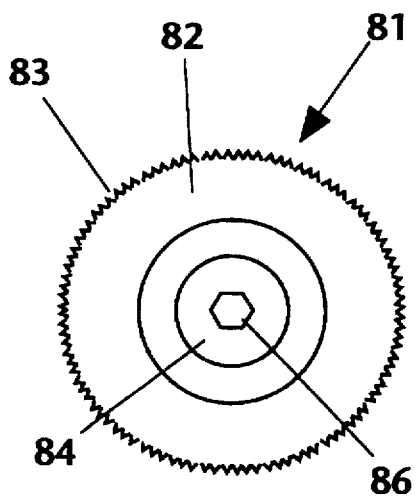
Figure_9
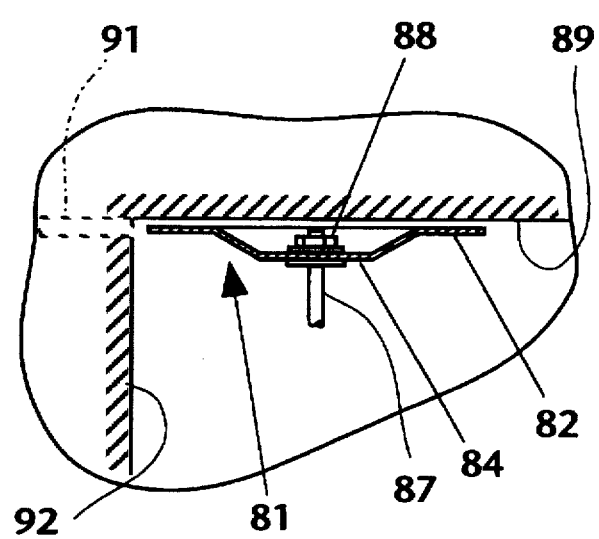
Figure_10

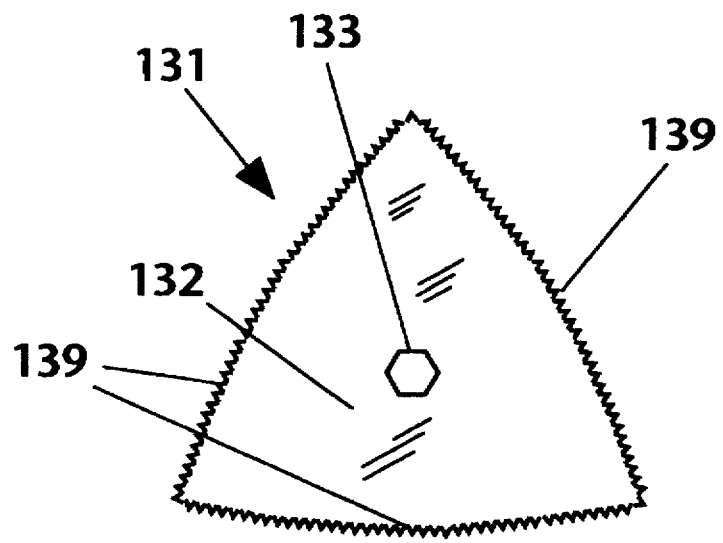
Figure_11
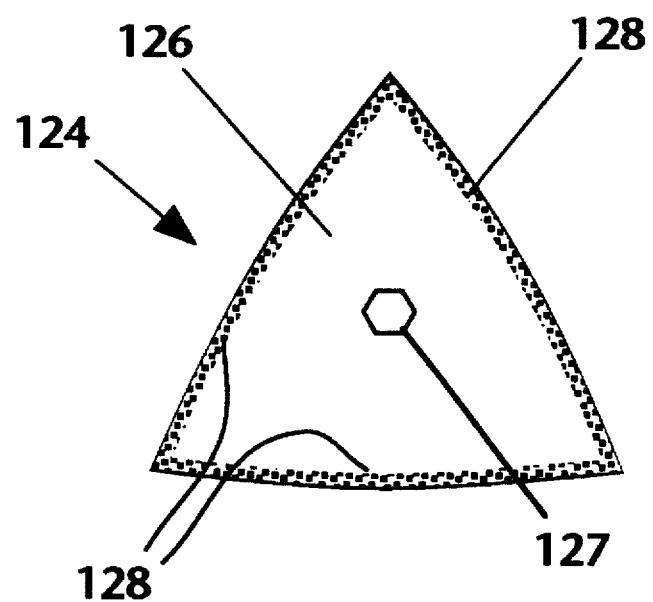
Figure_12

OSCILLATING CUTTING BLADES

BACKGROUND OF THE INVENTION

The present invention relates generally to power saw cutting blades, and more particularly to cutting blades adapted for use with angularly oscillating drive systems.

Cutting tools employing an angularly oscillating drive system have been known in the prior art for decades. Oscillating saws are known in the prior art to comprise a circular blade having fine pitch teeth and an oscillating motor drive to drive the blade reciprocally through an angular excursion of a few degrees or less. These devices generally have been used for medical purposes such as cutting plaster casts to effect removal thereof from a limb or body portion. Oscillating saws are also used to cut bone; e.g., to sever the sternum and create an entry opening for cardiac bypass surgery and other open heart procedures.

An oscillating saw construction tool is disclosed in U.S. Pat. No. 5,265,340, issued Nov. 30, 1993 to the present inventors. This tool extends the oscillating saw concept to use in construction and building trades, including cutting wood or plastic paneling, sheet rock and wall board, plywood, glass board, linoleum and other floor coverings, Formica, wood or composition shingles, Lexan, Plexiglas, polycarbonate, and other plastic or resin materials, acoustic tile, light diffusers, aluminum gutters and flashing, PVC or ABS pipe, fittings, and gutters, expanded foam insulation and articles, pipe insulation, stucco, tile grout, copper pipe, and similar materials. Although this construction tool is well suited to such cutting tasks, the blades available in the prior art are not particularly designed for such purposes.

Most power saw blades known in the art are categorized as two general types: either circular blades that are adapted for cutting during rapid rotation, or linear blades that are adapted for cutting during linear reciprocal motion. In either case, the entire cutting edge is continually exposed to the workpiece, and as a result the cutting teeth are generally uniform and/or uniformly distributed along the cutting edge. Likewise, cutting blades that employ grit or other abrasives bonded to the blade surface adjacent to the curing edge generally employ a common grit size that is uniformly distributed along the cutting edge.

It is also true that rotating blades must be symmetrical about the rotational axis, to avoid severe vibration and balance problems due to eccentricity of the center of mass. Thus, non-circular blades are not available in the prior art.

In a angularly oscillating saw, only a small portion of the cutting edge is generally presented to the workpiece, and there is no need to maintain uniform cutting teeth or cutting grit throughout the cutting edge. Thus, there is an opportunity to combine different cutting teeth or cutting agents on separate segments of a single blade. The prior art lacks any such combination blade arrangement. Likewise, the prior art lacks any form of non-circular blade configuration that combines differing cutting teeth or cutting agents.

SUMMARY OF THE PRESENT INVENTION

The present invention generally comprises unique blade designs for rotational oscillating cutting. In one aspect, the invention includes different cutting teeth segments and cutting agent segments arranged along separate portions of a common cutting edge to carry out various cutting tasks. In another aspect, the invention includes non-circular cutting blades that have separate cutting edge segments, each segment having different cutting teeth or cutting agents. The various cutting edge segments may be impinged on the workpiece by proper orientation of the cutting tool, or by mounting the blade on the tool to present the desired cutting segment to the workpiece.

One embodiment of the blade shape comprises a circular blade adapted to be driven in rotational oscillation about the center of the circle. The blade edge may include one portion having grit bonded to the cutting edge to cut hard objects, and another portion having cutting teeth for cutting softer objects. Likewise, the blade edge may include two portions, each having cutting teeth of differing size and pitch to cut differing materials.

A variation of the circular blade includes a circular outer periphery having cutting teeth or grit bonded thereto, and a concentric central portion that is formed in a dished depression. The mounting hole is centered in the depression, and the depression provided clearance for the distal end of the tool shaft and the nut that joins the blade thereto. Thus the blade may be used with the circular outer periphery disposed flush against a wall surface or the like, so that orthogonal cuts may be formed directly in the intersection of two wall surfaces.

Another embodiment of the invention comprises a triangular blade adapted to be driven in rotational oscillation about the centroid of the triangle. The cutting edges defined by the sides of the triangle may be provided with cutting grit bonded to the edges. Alternatively, at least one side of the triangle may be provided with cutting teeth, so that each side of the triangle is adapted to cut different types of materials.

A further embodiment of the invention comprises a teardrop shaped blade, defined by a pair of generally straight edges extending from a common vertex to opposed ends of an arcuate edge segment. All of the edge portions may be provided with cutting grit bonded to the edges. Alternatively, the arcuate segment may be provided with cutting grit bonded thereto to cut hard materials, and the straight edges may be provided with cutting teeth to cut softer materials. Alternatively, one straight edge and a contiguous portion of the arcuate segment may be provided with cutting grit bonded thereto, and the other straight edge and contiguous portion of the arcuate segment may be provided with cutting teeth.

Another embodiment of the invention comprises a generally rhomboidal blade, defined by four edges having similar lengths and non-orthogonal included angles. All of the edge portions may be provided with cutting grit bonded to the edges. Alternatively, one pair of edges may be provided with cutting grit bonded thereto, and the other pair of edges may be provided with cutting teeth.

Other blade shapes may be designed, and other combinations of cutting teeth and cutting agents may likewise be devised, without departing from the spirit and teaching of the invention.

BRIEF DESCRIPTION OF THE DRAWING

FIG. 1 is a plan view of a circular blade for rotational oscillating cutting having one edge portion provided with cutting grit and another edge portion provided with cutting teeth.

FIG. 2 is a plan view of a circular blade for rotational oscillating cutting having two edge portions, each provided with cutting teeth of differing size and pitch.

FIG. 3 is a plan view of a triangular blade for rotational oscillating cutting having cutting grit bonded to all edges.

FIG. 4 is a plan view of a triangular blade for rotational oscillating cutting having cutting grit bonded to one edge and cutting teeth provided to at least one edge.

3

FIG. 5 is a plan view of a teardrop shape blade for rotational oscillating cutting having cutting grit bonded to the entire edge.

FIG. 6 is a plan view of a teardrop shape blade for rotational oscillating cutting having cutting grit bonded to the arcuate edge portion and cutting teeth provided to the linear edge portions.

FIG. 7 is a plan view of a teardrop shape blade for rotational oscillating cutting having cutting grit and cutting teeth distributed in bilateral symmetry to the edges thereof.

FIG. 8 is a plan view of a rhomboidal shape blade for angular oscillating cutting having cutting grit and cutting teeth distributed in bilateral symmetry to the edges thereof.

FIG. 9 is a plan view of a circular blade for angular oscillating cutting having a dished central depression to provide clearance for a tool shaft.

FIG. 10 is a cross-sectional elevation showing the circular blade depicted in FIG. 9 used in forming an orthogonal cut at the intersection of two wall surfaces.

FIG. 11 is a plan view of a trianguloid shape blade for angular oscillating cutting having cutting teeth formed at the edges thereof.

FIG. 12 is a plan view of a trianguloid shape blade for angular oscillating cutting having cutting grit bonded to the edges thereof.

DESCRIPTION OF THE PREFERRED EMBODIMENT

The present invention generally comprises unique blade designs for rotational oscillating cutting. The invention may be employed with an oscillating saw construction tool as disclosed in U.S. Pat. No. 5,265,340, or with other power saws or power sanders that provide a angularly oscillating drive shaft. With regard to FIG. 1, one embodiment of the invention comprises a blade 11 formed of a circular disc 12 having a mounting hole 13 formed in the center thereof. The blade includes a semicircular edge segment 16 that is provided with cutting teeth extending generally radially therefrom, as is known in the prior art. The other semicircular edge segment 14 has no teeth; rather, cutting grit is bonded to the surfaces of the blade directly adjacent to the edge, as in also known in the art. The cutting grit may comprise tungsten carbide particles secured to the blade surface by chemical or metallurgical bonding, adhesive, or the like. The cutting grit edge 14 is suitable for cutting hard materials such as ceramic, cement, mortar, metals, hardened plastic, and the like. The edge 16 is suitable for cutting softer materials, such as wood, soft plastic or polymer, sheet rock, etc.

With regard to FIG. 2, a further embodiment of the invention comprises a blade 17 formed of a circular disc 18 having a mounting hole 19 formed in the center thereof. The blade 17 includes a semicircular edge segment 21 that is provided with fine cutting teeth extending generally radially therefrom, and another semicircular segment 22 provided with coarse cutting teeth extending therefrom. The coarse teeth segment 22 may be used to cut soft rigid materials such as sheet rock, whereas the fine cutting teeth segment may be used to cut soft metals (aluminum, copper, etc.), harder plastic and polymer materials, and the like.

Referring to FIG. 3, another embodiment of the invention comprises a blade 24 formed of a triangular planar member 26 having a mounting hole 27 approximately at the centroid thereof. The side edges of the blade 24 have no teeth; rather, cutting grit 28 is bonded to the surfaces of the blade in a border directly adjacent to the edges, the bonding being accomplished by any method known in the art. The cutting grit may comprise tungsten carbide particles secured to the blade surface by chemical or metallurgical bonding, adhesive, or the like. The triangular form provides differing cutting rates, based on the fact that the absolute velocity of the rotational oscillation varies with the radial distance from the opening 27. Thus, for example, a vertex may be used to initiate a plunge cut, and a medial edge portion may then be used to extend the cut.

A further embodiment of the invention, shown in FIG. 4, comprises a blade 31 formed of a triangular planar member 32 having side edges 34, 36, and 38. A mounting hole 33 is provided centrally to the three sides. The side edges 34 and 36 are provided with a border 37 of grit bonded to the upper and lower surfaces of the blade. The side edge 38 is provided with cutting teeth 39. Thus, the edges 34f and 36 may be employed to cut hard materials, whereas the edge 38 may be used to cut relatively softer materials. As is true in all the multifunctional blades described herein, this change in function may be accomplished by reorienting the cutting tool to present the selected edge to the workpiece, or by removing and resetting the blade to the desired angular position about an axis passing through the mounting hole 33.

Referring to FIG. 5, another embodiment of the invention comprises a blade 41 formed of a teardrop shaped planar member 47. The teardrop shape is defined by a pair of generally straight edges 42 and 43 extending from a common vertex 48, the edges 42 and 43 joining respective ends of an arcuate edge portion 44. A mounting hole 46 is formed centrally in the blade. The cutting agent comprises a border 49 of grit bonded to the blade surfaces adjacent to the edges 42, 43, and 44 and extending continuously thereabout. Any portion of the edges may be used to cut hard materials.

The embodiment of FIG. 6 comprises a blade 51 formed of a teardrop shaped planar member 57. The member 57 includes a pair of generally straight edges 52 and 53 extending from a common vertex 58, the edges 52 and 53 joining respective ends of an arcuate edge portion 54. A mounting hole 56 is formed centrally in the blade. The edges 52 and 53 are provided with cutting teeth 55, and the arcuate edge 54 is provided with a border 59 of grit bonded to both surfaces of the blade adjacent to the edge 54. The teeth 55 may be used to cut relatively soft materials, and the arcuate edge may be used to cut relatively harder materials, so that the single blade 57 provides multifunctional use.

In FIG. 7 there is shown an embodiment in which a teardrop shaped planar member 67 defines a blade 61 that is also multifunctional. One linear edge 63 and a contiguous portion of the arcuate edge 64 are provided with cutting teeth. The other linear edge 62 and the remaining contiguous portion of the arcuate edge 64 is provided with a border 69 of grit bonded to both surfaces of the blade adjacent to these edge portions. The blade is thus bilaterally symmetrical, with a mounting hole 66 disposed centrally and straddling the plane of symmetry.

Another embodiment of the blade of the invention, shown in FIG. 8, comprises a planar member 71 having the form of a rhomboid defined by four contiguous edges of similar or identical length that define non-perpendicular included angles. Two contiguous edges 72 are provided with cutting teeth 73 extending therefrom, and the other two edges 74 are provided with a border 76 of cutting grit bonded to both surfaces of the blade adjacent to these edges 74.

A further variation of the circular blade described previously, shown in FIG. 9, comprises a blade 81 having an annular planar peripheral portion 82, with cutting teeth 83 extending outwardly therefrom. A central circular portion 84 is formed in a dished depression, and a mounting hole 86 is disposed coaxially in the depression 84. The depth of the depression 84 is sufficient to provide clearance for the end portion of the tool drive shaft 87 extending through the mounting hole 86, and for the nut 88 which secures the blade to the shaft 87, as shown in FIG. 10. The blade may be employed with the portion 82 disposed flush to a wall surface 89, so that a cut 91 may be formed in orthogonal fashion in an intersecting wall surface 92. This type of cut cannot be accomplished by any tool or blade combination known in the prior art.

A further embodiment of the invention, shown in FIG. 11, comprises a blade 131 formed of a trianguloid planar member 132 having equal convex side edges extending in equilateral fashion. A mounting hole 133 is provided centrally to the three sides. The side edges are all provided with cutting teeth 139.

Referring to FIG. 12, another embodiment of the invention comprises a blade 124 formed of a trianguloid planar member 126 having a mounting hole 127 approximately at the centroid thereof. The side edges of the blade 124 are curved in convex fashion and have no teeth; rather, cutting grit 128 is bonded to the surfaces of the blade in a border directly adjacent to the edges, the bonding being accomplished by any method known in the art. The embodiments of FIGS. 11 and 12 may be modified by substituting a toothed edge of one for a grit edge of the other, or vice versa.

In any of the embodiments described herein that include the use of grit bonded to the surface of the blade, it may be appreciated that the grit size and material may be selected in accordance with the materials to be cut.

It is noted that the invention combines the use of differing cutting agents with various forms of circular and non-circular blade geometries to create cutting blades that are multifunctional.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

We claim:

1. A cutting blade for an angularly oscillating tool, including;

a teardrop-shaped planar member defined by a pair of generally straight edge segments extending from a common vertex to opposed ends of an arcuate edge segment;

wherein one of said pair of generally straight edge segments includes a plurality of teeth formed therein and arrayed therealong and extending generally in the plane of said planar member; and, another of said pair of generally straight edge segments includes a border of cutting grit secured directly adjacent thereto;

said pair of generally straight edge segments being spatially separated and disposed to be separately and individually brought to bear against an object to be cut, said cutting grit and said plurality of teeth extending in respective opposite directions from said common vertex;

said one generally straight edge segment being free of said border of cutting grit and said another generally straight edge segment being free of said plurality of teeth.

2. The cutting blade of claim 1, wherein said border of cutting grit is secured directly adjacent to said arcuate edge segment.

3. The cutting blade of claim 1, wherein said another of said straight edge segments and a contiguous portion of said arcuate edge segment are provided with a continuous border of cutting grit secured directly adjacent thereto.

4. The cutting blade of claim 3, wherein said one of said straight edge segments and a contiguous portion of said arcuate edge segment are provided with a plurality of cutting teeth extending therefrom in a continuous array.

* * * * *